(No Model.)
C. SUISSE.
Saw.
No. 229,772.      Patented July 6, 1880.
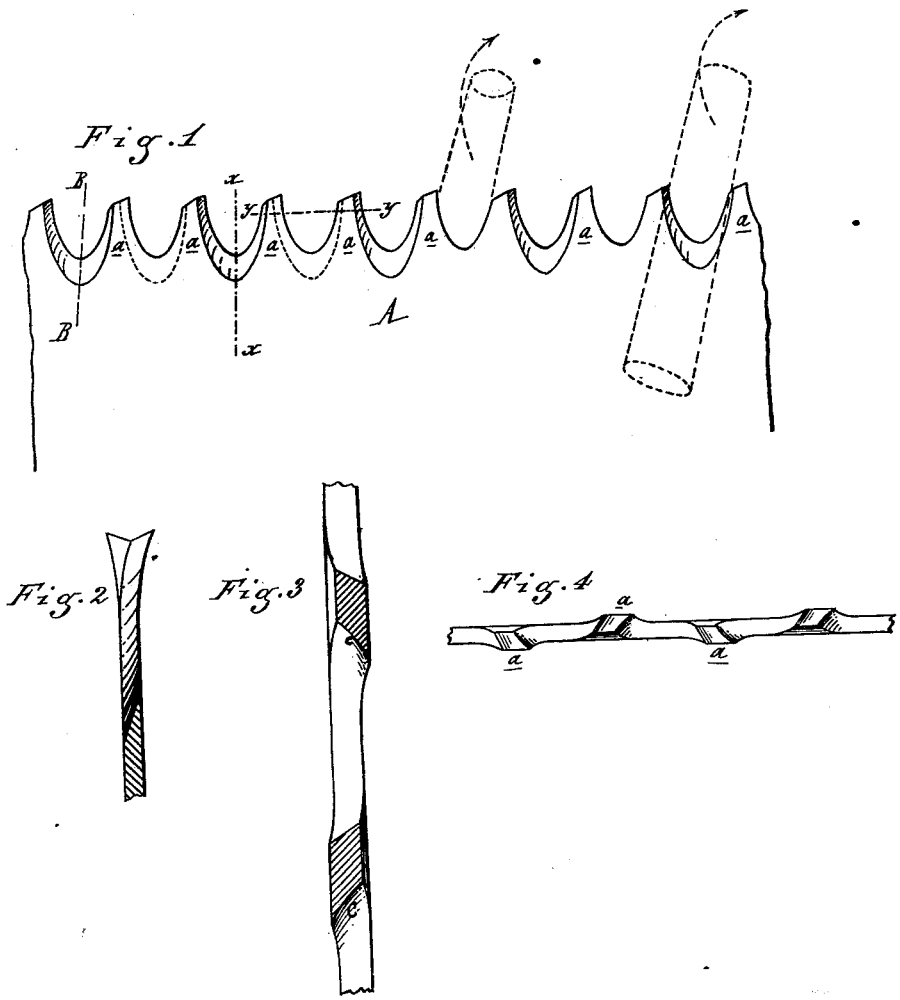

UNITED STATES PATENT OFFICE.

CHARLOUIS SUISSE, OF ST. CLAIR, MICHIGAN.

SAW.

SPECIFICATION forming part of Letters Patent No. 229,772, dated July 6, 1880.

Application filed March 12, 1880. (No model.)

*To all whom it may concern:*

Be it known that I, CHARLOUIS SUISSE, of St. Clair, St. Clair county, Michigan, have invented an Improvement in Saws, of which the following is a specification.

The nature of this invention relates to certain new and useful improvements in sawteeth, so as to produce a tooth which shall have an extended cutting-edge; and the invention consists in the peculiar construction and formation of the teeth, as more fully hereinafter set forth.

In the drawings, Figure 1 is a side elevation of a section of a saw, showing my improved form of teeth. Fig. 2 is a cross section on line $x\,x$. Fig. 3 is a longitudinal section on the line $y\,y$. Fig. 4 is a plan view of the cutting or toothed edge of the saw.

In the accompanying drawings, which form a part of this specification, A represents a saw-blade provided with the teeth $a$, which are formed in the following manner: I take a round file, (shown in dotted lines in Fig. 1,) and when making the cutting or forward stroke I partially rotate the same, which, by holding the file at an angle to the teeth, cuts a parabolic indentation, whose axis B B is slightly inclined forward, as shown, the rotation giving the cutting-edge a concave section, as shown at $c$ in Fig. 3. By thus filing between every other or alternate pair of teeth upon opposite sides of the saw a cutting-edge is formed upon each tooth upon alternate sides of the sawblade, which cutting-edges are upon corresponding edges of the teeth—that is, toward the front or toe of the saw. After the teeth have been filed, as above described, I take a suitable file and file down the points of the teeth, slightly inclining from the front or cutting-edge back, which leaves them in nearly a diamond shape, as shown. The teeth now being properly filed, they are set, as in the ordinary manner, and the saw is ready for use.

A saw formed in this way has, instead of the usual straight-faced teeth, caused by the ordinary mode of making saws, a series of teeth, each tooth having a planing edge and a concave face, and as the indentations are cut on alternate sides between each two teeth, the planing-edges are made alternately on opposite sides, and by this means a saw is produced that is very rapid in its actions and smooth in its cut.

I have described above the method I prefer to employ in forming the saw-teeth on the blade by a round file manipulated as set forth, though saw-teeth of the same construction may be formed on the blade by other means, and I do not desire to confine myself to any particular means of forming such teeth, my claim being designed to cover a saw-blade having teeth constructed as hereinbefore described.

What I claim as my invention is—

The saw-plate A, having teeth $a$, formed by a series of parabolic indentations cut alternately from opposite sides of the plate, the teeth being provided with concave faces $c$ and planing-edges on opposite sides alternately, substantially as described, and for the purpose specified.

CHARLOUIS SUISSE.

Witnesses:
H. S. SPRAGUE,
A. BARTHEL.